United States Patent [19]
Fox et al.

[11] Patent Number: 4,567,249
[45] Date of Patent: Jan. 28, 1986

[54] MELT PREPARATION OF POLYAMIDE BY AMIDE ESTER INTERCHANGE

[75] Inventors: Daniel W. Fox; Sheldon J. Shafer, both of Pittsfield, Mass.

[73] Assignee: General Electric Company, Pittsfield, Mass.

[21] Appl. No.: 553,152

[22] Filed: Nov. 18, 1983

[51] Int. Cl.³ .............................................. C08G 69/28
[52] U.S. Cl. .................................... 528/347; 528/335; 528/339; 528/340; 528/346
[58] Field of Search ............... 528/347, 339, 340, 346, 528/335

[56] References Cited

U.S. PATENT DOCUMENTS

| | | |
|---|---|---|
| 2,840,547 | 6/1954 | Stump . |
| 3,379,695 | 4/1968 | Wolfes et al. ......................... 528/347 |
| 3,459,714 | 8/1969 | Wolfes et al. ......................... 528/347 |
| 3,846,379 | 11/1974 | Schneider et al. ................... 528/347 |

FOREIGN PATENT DOCUMENTS 1049987  11/1960  United Kingdom .

Primary Examiner—Harold D. Anderson
Attorney, Agent, or Firm—John W. Harbour; William F. Mufatti; Edward K. Welch, II

[57] ABSTRACT

Melt-processable polyamides are prepared smoothly and rapidly by interchange of diesters of dicarboxylic acids with diamines in a solventless melt phase process.

10 Claims, No Drawings

MELT PREPARATION OF POLYAMIDE BY AMIDE ESTER INTERCHANGE

BACKGROUND OF THE INVENTION

Polyamides, useful as molding resins and as film and fiber formers, are made commercially by reacting a diacid or diacid precursor with a diamine. In one process a diacid is initially reacted with a diamine in an aqueous media to form a solid polyammonium salt which precipitates from the reaction mixture. The solid is then heated successively in an autoclave reactor under pressure to control explosive initial dehydration and subsequently under reduced pressure to effect conversion of the polyammonium salt to a polyamide. This requires expensive equipment and very careful process control in order to optimize heat and mass transfer. The high melting solid salt which initially can't be stirred undergoes almost explosive dehydration as the reactor temperature is increased. The solid salt is converted to a mobile liquid which increases in viscosity as additional water is removed as high pressure steam. An alternate approach to the use of autoclaves consists of dispersing the polyammonium salts in highly polar solvents and effecting dehydration and solubilization by elevating the temperature of the solution. This process eliminates the need for autoclaves but invokes the use of very special high boiling solvents. The product must ultimately be recovered from solution as a solid. The expensive, high boiling, polar and frequently toxic solvents must be completely removed from the product and be very efficiently recycled to control manufacturing costs. In still another version, the diacids may be first converted to diacid chloride derivatives which can be reacted in solution or interfacially with diamines at relatively low temperatures to yield polyamides. Very corrosive hydrogen chloride is produced as a by-product of this reaction. The by-product acid must be completely removed from the solution or dispersion of polymer and the polymer must be separated from the reaction solvent. Again the solvent must be efficiently recycled. The process of the present invention on the other hand is smooth and rapid, and it is widely applicable, being limited, apparently, only by the ultimate nature of the final product, which must be melt processable, i.e., it must have a melting point below the thermal decomposition temperature. In practice, this excludes only a relatively few polyamides, namely, high melting materials such as polyamides containing units derived from p-phenylene diamine, or m-phenylene diamine and aromatic diacids, such as isophthalic and terephthalic acids, or polyamides derived from the 4,4'-dicarboxylic acid of diphenyl, and the like. In general, subject to the foregoing requirement that the ultimate product be melt processable, the dibasic acid diester should be a diaryl ester of a dicarboxylic acid containing 5 carbon atoms and above, i.e., glutaric, adipic, sebacic acid etc. The di-primary amines should include those of 4 carbon atoms and above, i.e., tetramethylene, pentamethylene, hexamethylene diamine, etc.

The novel products of the process are also features of the invention, many of them being transparent, tough, and solvent-resistant.

SUMMARY OF THE INVENTION

According to the present invention, there is provided a process for the preparation of a melt processable polyamide by ester-amide interchange, said process comprising heating in the substantial absence of a solvent a mixture of at least one diaryl ester of a dicarboxylic acid having at least 6 carbon atoms and at least one di-primary amine having at least 4 carbon atoms, at a temperature above the melting point of said polyamide under phenolic compound removing conditions until formation of said polyamide is substantially complete. Polyamides made by the process are unusually tough and generally transparent, and they do not dissolve in conventional solvents, giving them unusual and beneficial properties, e.g., as wrappings for food.

DETAILED DESCRIPTION OF THE INVENTION

Illustratively, useful diaryl esters of dicarboxylic acids suitable for use in the process of the present invention are diphenolic esters derived from phenolic compounds, e.g., a monohydric phenol, including phenol itself, and alkyl- or halo-substituted phenols, such as o-,m-, and p-cresols, and o- and p-chlorophenol, and the like, and a dicarboxylic acid, e.g., one having at least 5 carbon atoms, such as the aliphatic diacids like glutaric acid, adipic acid, azeleic acid, 1,12-dodecane dicarboxylic acid, and others, of up to about 30 inclusive carbon atoms and the aromatic diacids, such as phthalic, isophthalic and terephthalic acid. The acids must be higher boiling than phenol to facilite synthesis. Generally not suitable, because they do not produce melt-processable polyamides, are combinations of diphenolic esters of aromatic dicarboxylic acids with aromatic diamines. A preferred family of diesters are diphenolic esters of terephthalic acid, isophthalic acid, and mixtures thereof.

As examples of di-primary amines, particularly useful in the process are those of the general formula $H_2N-R-NH_2$ wherein R is divalent straight chain, branched or cyclic alkylene or arylene of such groups optionally interrupted with carbonyl, amino, sulfur-containing groups, and the like, with a total carbon content of the order of 4 to 30 carbon atoms. Illustrative examples are 1,4-tetramethylene diamine, 1,6-hexamethylene diamine, 1,12-diaminododecane, bis(4-aminocyclohexyl)methane, mixtures thereof, and the like. Generally unsuitable are di-primary aromatic diamines, such as m-phenylene diamine and p-phenylene diamine, which have a general tendency to produce polyamides which are so high melting as to be not melt-processable, especially when reacted with isophthalates and terephthalates.

In general, the process is carried out by charging the mixture into a reaction vessel and heating the reactants until they are melted. The ester-amide interchange reaction occurs smoothly and rapidly at temperatures in the range of from about 135° C., to about 350° C., and pressures from atmospheric down to about 15 torr. The reactor should permit removal of the byproduct phenolic compound as it is produced. Temperatures in the above mentioned range readily permit removal by distillation of the usual byproducts, e.g., phenol, o-cresol, p-chlorophenol, and the like.

An alternate polymerization and polymer recovery process consists of heating the mixture until the appropriate interchange has occurred without removal of the phenolic by-products. Polymer recovery may be effected by means of anti-solvent addition to precipitate the polymer.

The polymers are recovered in conventional ways and they may be molded in any desired shape and are useful as structural and engineering materials to replace metal parts, in electrical appliances, as lenses, safety shields, instrument windows and in food wrappings. They are used in many other ways known for such polymers.

DESCRIPTION OF THE PREFERRED EMBODIMENTS

The invention is further described in the examples which follow. These examples are illustrative embodiments of the invention, and are not to be construed in limitation thereof. Polymeric products were thermally characterized by glass transition temperature (Tg) and crystal melting point (Tm) as determined with a Perkin-Elmer DSC-2 instrument at a scanning rate of 20° C./min. The relative degree of polymerization was estimated by determining intrinsic viscosities in a 40:60 tetrachloroethane:phenol mixture at 30° C. and reported as deciliters/gram.

EXAMPLE 1

A 500-ml 3-necked round bottomed glass flask was fitted with a glass paddle stirrer, a nitrogen blanket inlet and a reflux condenser with side take off arm. A mantle was used to supply heat. To the vessel was added 190.8 g. of diphenyl isophthalate and 73.8 g. of 1,6-hexamethylenediamine. The mixture was heated during 40 minutes from 190° C. to 253° C. at less than atmospheric pressure and a total of 84 grams of distillate (phenol) was collected. The transparent polymeric hexamethylene isophthalamide solidified in the reaction flask; it was amorphous, and it did not dissolve in chloroform.

EXAMPLE 2

The general procedure of Example 1 was repeated, using 119 g. of 1,6-hexamethylenediamine and 310 g. of diphenyl isophthalate. This reaction was conducted in two stages. The first phase of the reaction was stopped at the pre-polymer stage. The product could be readily poured from the reaction flask. Its glass transition temperature (Tg) was 78° C. A portion of this pre-polymer was further polymerized at 285° C. under a vacuum of about 1 mm. of mercury. There was thus obtained a high molecular weight polyamide, Tg., 116° C., and having an intrinsic viscosity, (I.V.), of 0.83 dl/g.

EXAMPLE 3

The general procedure of Example 2 was repeated, substituting a 1:1 molar mixture of diphenyl terephthalate and diphenyl isophthalate for the diphenyl isophthalate. The high molecular weight product had a Tg of 127° C., and an IV of 1.34 dl/g.

EXAMPLE 4

The general procedure of Example 2 was repeated, substituting 1,12-diaminododecane for the 1,6-hexamethylenediamine. The high molecular weight product had a Tg of 86° C., and an IV of 0.86 dl./g.

EXAMPLE 5

The general procedure of Example 2 was repeated, substituting a 0.7:0.3 molar mixture of 1,6-hexamethylenediamine and bis(4-aminocyclohexyl)methane for the 1,6-hexanemethylenediamine. The high molecular weight product had a Tg of 155° C., and an IV of 0.85 dl/g.

EXAMPLE 6

The reaction apparatus was the same as described in Example 1. The charge of raw materials was 74.6 grams of diphenyl adipate and 29.4 grams of 1,6-hexamethylene diamine. The reaction mixture was heated to 195° C. for a period of 40 minutes without the removal of any of the by-product phenol. A portion of the polymer solution was then poured into rapidly stirred methanol to effect precipitation of the polymer. The precipitation polymer was washed several times with additional methanol, filtered and dried. The polymer recovered in this manner was characterized by determining the crystal melting point to be 250° C. and the IV was 0.69 dl/g. The polyamide in the remaining reaction mixture was isolated by removal of phenol at elevated temperature under reduced pressure. This portion of the hexamethylene adipamide (6,6-nylon) polymer had a crystal melting point of 250° C. and an IV of 0.78 dl/g. This example illustrates two different isolation procedures for the same polymerization process.

EXAMPLE 7

A mixture of 16.0 g (0.054 moles) of diphenyl adipate and 5.0 g (0.057 moles) of 1,4-diaminobutane were placed in a side arm test tube equipped with a mechanical stirrer and a nitrogen blanket. The test tube was heated in an oil bath to 140° C. and held there 45 minutes. The temperature was then raised to 180° C. and held there for 20 minutes. Finally the temperature was raised to 295° C. and the by-product phenol removed slowly under reduced pressure. The resulting crystalline polymer gave a Tm—289° C. and an IV—0.80 dl/g.

The foregoing detailed description will suggest many variations to those skilled in this art. For example, di-orthocresyl terephthalate and di-para-chlorophenyl terephthalate can be substituted for the diphenyl terephthalate. Diphenyl adipate can be substituted for diphenyl terephthalate. And tetramethylenediamine can be substituted for the 1,6-hexamethylenediamine. All such variations are within the full scope of the appended claims.

We claim:

1. A process for the preparation of a polyamide by ester-amide interchange, said process consisting of heating a mixture of at least one diaryl ester of a dicarboxylic acid having at least 6 carbon atoms and at least one diamine having at least 4 carbon atoms, at a temperature above the melting point of said polyamide until formation of said polyamide is substantially complete.

2. A process according to claim 1, wherein the diester of the dicarboxylic acid is selected from the group consisting of a diaryl terephthalate, a diaryl isophthalate and a mixture thereof.

3. A process according to claim 2, wherein the diaryl terephthalate is diphenyl terephthalate.

4. A process according to claim 2, wherein the diaryl isophthalate is diphenyl isophthalate.

5. A process according to claim 1, in which the diaryl ester is diphenyl adipate.

6. A process according to claim 1, where the diamine is selected from the group consisting of 1,6-hexamethylenediamine, 1,12-diaminododecane, bis(4-aminocyclohexyl)methane and mixtures of any of the foregoing.

7. A process according to claim 1, comprising heating a mixture of diphenyl adipate and 1,4-diaminobutane under the conditions described.

8. A process comprising the steps of (a) preparing a polyamide by the method of claim 1; and simultaneously thereto
(b) removing said reaction by-products from said mixture.
9. A process comprising the steps of
(a) preparing a polyamide by the method of claim 1; and subsequently thereto
(b) recovering said polyamide from said reaction by-product.

10. A process for the preparation of a polyamide by ester-amide interchange, said process comprising heating a mixture consisting of at least one diaryl ester of a dicarboxylic acid having at least 6 carbon atoms and at least one diamine having at least 4 carbon atoms, at a temperature above the melting point of said polyamide until formation of said polyamide is substantially complete.

* * * * *